United States Patent
Fischer et al.

(10) Patent No.: US 7,217,891 B2
(45) Date of Patent: May 15, 2007

(54) CAPACITIVE SENSING APPARATUS FOR A VEHICLE SEAT

(75) Inventors: Thomas Fischer, Wenden (DE); Mike Albani, Leverkusen (DE); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/239,646

(22) Filed: Sep. 29, 2005

(65) Prior Publication Data

US 2007/0068720 A1   Mar. 29, 2007

(51) Int. Cl.
*B60R 21/015* (2006.01)
*G01G 3/12* (2006.01)

(52) U.S. Cl. .................. 177/144; 177/210 C; 180/273; 280/735; 73/862.52; 73/862.626; 364/283.1; 364/291

(58) Field of Classification Search ................ 177/144, 177/210 R, 210 C; 180/273; 280/735; 73/862.52, 73/862.626; 364/283.1, 291
See application file for complete search history.

(56) References Cited

U.S. PATENT DOCUMENTS

| | | | | |
|---|---|---|---|---|
| 3,895,421 A | * | 7/1975 | Miller | 29/25.42 |
| 4,526,043 A | | 7/1985 | Boie et al. | |
| 4,633,237 A | * | 12/1986 | Tucknott et al. | 340/573.4 |
| 4,644,801 A | * | 2/1987 | Kustanovich | 73/862.046 |
| 4,651,133 A | | 3/1987 | Ganesan et al. | |
| 5,878,620 A | * | 3/1999 | Gilbert et al. | 73/172 |
| 6,345,839 B1 | * | 2/2002 | Kuboki et al. | 280/735 |
| 6,918,612 B2 | * | 7/2005 | Smith et al. | 280/735 |
| 6,927,678 B2 | | 8/2005 | Fultz et al. | |
| 2006/0066085 A1 | * | 3/2006 | DuRocher | |
| 2006/0196281 A1 | * | 9/2006 | Koors | |

* cited by examiner

*Primary Examiner*—Randy W. Gibson
(74) *Attorney, Agent, or Firm*—Jimmy L. Funke

(57) ABSTRACT

A capacitive sensing apparatus for a vehicle seat includes a deflectable dielectric mat and a flexible printed circuit that wraps around the major surfaces of the dielectric mat to define upper and lower conductor strips that overlap in a direction perpendicular to the dielectric mat. Overlapping regions of the conductor strips define an array of capacitive load cells distributed over the seating surface. A connector stub depending from the flexible printed circuit couples the conductor strips to an external circuit that measures the capacitance of the various load cells to determine occupant weight and weight distribution.

6 Claims, 3 Drawing Sheets

CAPACITIVE SENSING APPARATUS FOR A VEHICLE SEAT

TECHNICAL FIELD

The present invention related to a capacitive sensing apparatus for vehicle seat occupant classification and weight estimation.

BACKGROUND OF THE INVENTION

Seat occupant detection systems are commonly in connection with air bags and other pyrotechnically deployed restraints as a means of judging whether, and how forcefully, to deploy the restraint. It has been shown that the seated weight of the occupant in combination with the weight distribution over the seating area can be used to reliably classify the occupant for purposes of restraint deployment. For example, normal energy deployment can be enabled for adults, reduced energy deployment can be enabled for a seated child, and deployment can be disabled entirely for a child seat or infant seat.

Of the various ways that have been devised for determining the seated weight and weight distribution of an occupant, perhaps the most simple and cost-effective involves installing a multi-sensor pad in or under the bottom foam cushion of the seat. For example, the U.S. Pat. No. 5,474,327 to Schousek and U.S. Pat. No. 5,732,375 to Cashler disclose the use of sensor pads comprising a plurality of variable resistance pressure sensors. A somewhat different approach is found in the U.S. Pat. No. 6,578,871 to Gray et al., where the sensor pad comprises a plurality of fluid-filled chambers corresponding to different areas of the seat and sensors for detecting the fluid pressure in each of the chambers. Finally, the U.S. Pat. No. 6,927,678 to Fultz et al. discloses a capacitive sensor pad defined by a fluid-filled seat bladder with upper and lower metalized films adjoining the major surfaces of the bladder; the bladder and its fluid form a dielectric that locally varies in thickness as a function of the force applied to the seat by an occupant. In Fultz et al., force distribution on the seat is sensed by dividing the upper (or lower) metalized film into a plurality of individual metalized segments to define an array of capacitive sensing elements with respect to the lower (or upper) metalized film.

While the capacitive sensing approach described in the aforementioned U.S. Pat. No. 6,927,678 to Fultz et al. can be very cost effective to manufacture and install, the number of sensing elements is limited by electrical connection costs. As a result, the overall resolution of the sensor pad is similarly limited and the development effort to determine optimal sensor placement for a given seat configuration can be considerable. Also, when the seat has a metallic cushion support pan, parasitic coupling between the lower metalized sensor film and the seat pan can introduce error in the capacitance measurements. Accordingly, it is desired to increase the number of sensing elements in a capacitive seat sensor array and reduce its susceptibility to measurement errors without increasing its cost of manufacture and installation.

SUMMARY OF THE INVENTION

The present invention provides an improved capacitive sensing apparatus for a vehicle seat including a deflectable dielectric mat and a flexible printed circuit that wraps around the major surfaces of the dielectric mat to define upper and lower conductor strips that overlap in a direction perpendicular to the dielectric mat. Overlapping regions of the conductor strips define an array of capacitive load cells distributed over the seating surface. A connector stub depending from the flexible printed circuit couples the conductor strips to an external circuit that measures the capacitance of the various load cells to determine occupant weight and weight distribution. The relatively small area of the overlapping conductor strip regions significantly reduces parasitic coupling between such regions and the seat pan, and the number of capacitive load cells for a given number of electrical interconnects is significantly increased for improved measurement resolution.

DESCRIPTION OF THE PREFERRED EMBODIMENT

Figure 1:
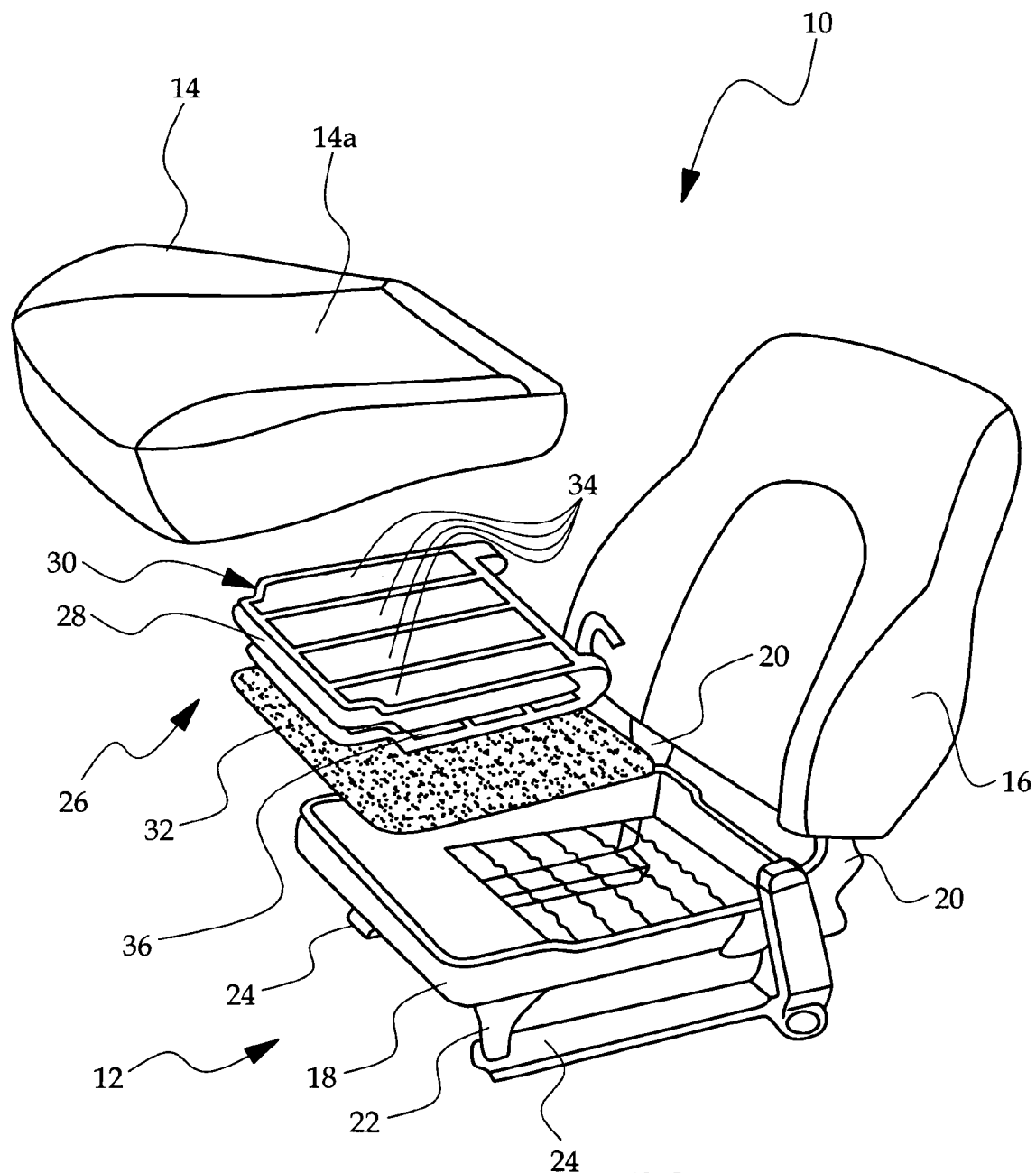
FIG. 1 is a partially exploded diagram of a vehicle seat and the capacitive sensing apparatus of the present invention.

Referring to FIG. 1, the reference numeral 10 generally designates a vehicle seat equipped with a capacitive sensing apparatus according to this invention. The seat 10 includes a frame assembly 12, a bottom foam cushion 14 and a back foam cushion 16. The frame assembly 12 includes a metal seat pan 18 with integral spring suspension for supporting the bottom foam cushion 14, and a set of depending frame elements 20 for supporting the back foam cushion 16. A set of posts 22 attach the seat pan 18 to pair of tracks 24, which in turn, are secured to the floor of the vehicle. A capacitive sensor assembly 26 is sandwiched between the bottom cushion 14 and the seat pan 18 for the purpose of determining occupant weight and weight distribution, as explained below.

Figure 2:
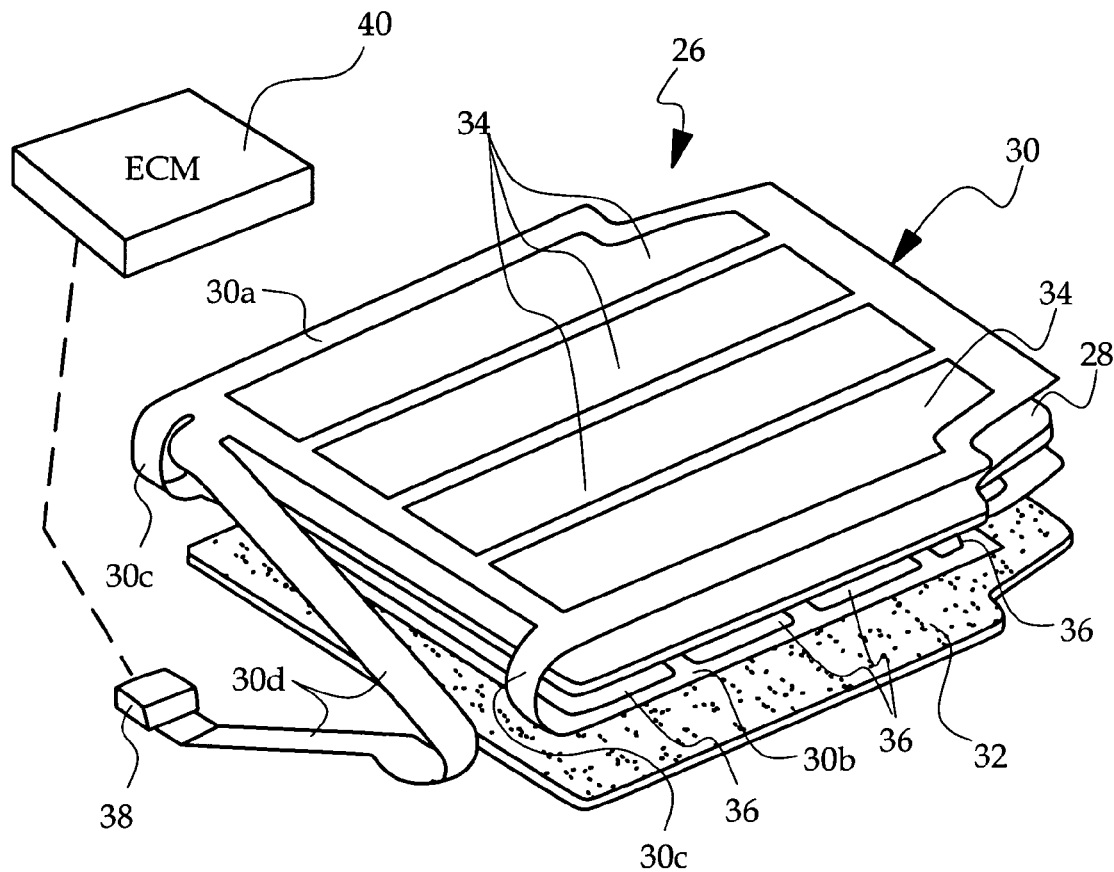
FIG. 2 is an enlarged diagram of the capacitive sensing apparatus of FIG. 1, along with an electronic control module.
Figure 3:
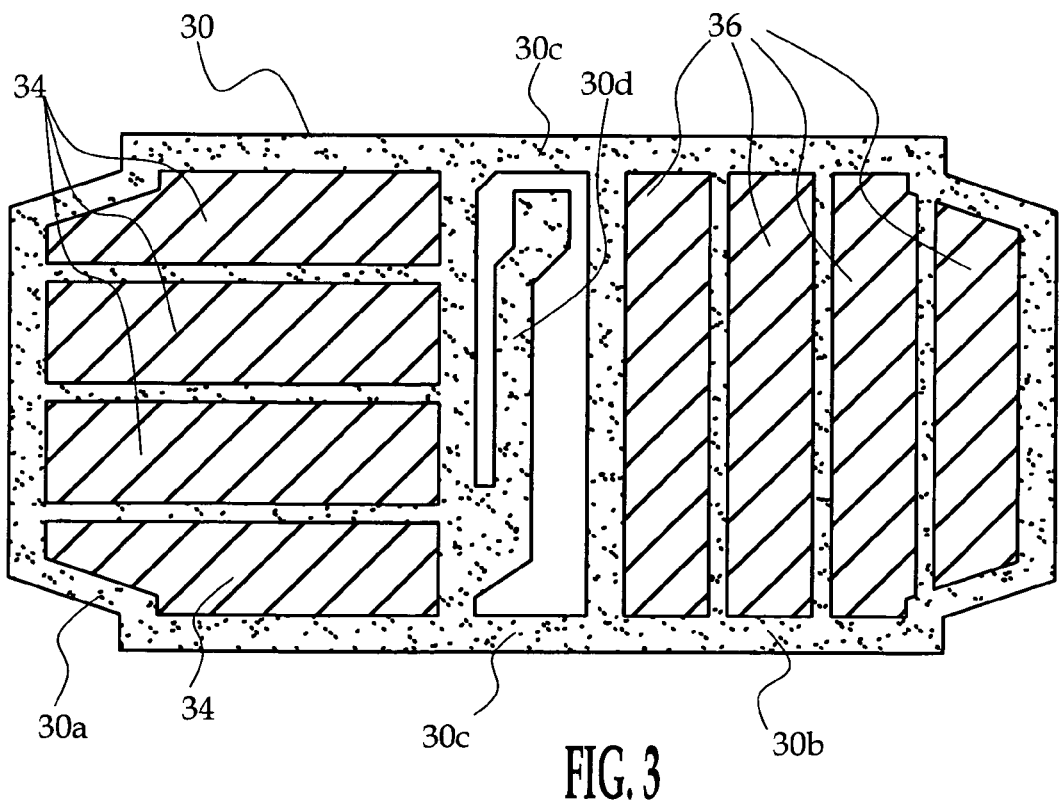
FIG. 3 is an un-folded view of a flexible printed circuit used in the capacitive sensing apparatus of FIGS. 1–2.

Referring to FIGS. 1–2, the capacitive sensor assembly 26 includes a dielectric mat 28, a flexible printed circuit 30, and a felt pad 32 disposed between the flexible printed circuit 30 and the seat pan 18. In the illustrated embodiment, the dielectric mat 28 is a fluid-filled elastomeric bladder such as shown in the aforementioned U.S. Pat. No. 6,927,678 to Fultz et al., incorporated herein by reference. However, other dielectric materials such as open-cell or closed-cell foam or woven fabric material may be used instead of an elastomeric bladder, so long as the material compresses or deflects in relation to the force applied to it. The flexible printed circuit 30 is folded around the dielectric mat 28 to define an upper major surface 30a that adjoins the foam bottom cushion 14 and a lower major surface 30b that adjoins the felt pad 32. FIG. 3 depicts the flexible circuit 30 in an un-folded state, with the upper major surface 30a on the left, and the lower major surface 30b on the right.

As seen in FIGS. 1–3, the upper major surface 30a of flexible circuit 30 supports a first set of parallel conductor strips 34, and the lower major surface 30b supports a second set of parallel conductor strips 36 that run perpendicular to the conductor strips 34. As best seen in un-folded view of FIG. 3, a portion of the flexible circuit 30 between the upper and lower major surfaces 30a, 30b is removed to define a pair of hinges 30c that fold around the dielectric mat 28 and an integral connector stub 30d that depends from the edge of upper major surface 30a. The connector stub 30d supports a set of thin conductor traces (not shown), one connected to each of the individual conductor strips 34 and 36. The stub 30d terminates in a connector 38 that is coupled to an electronic control module (ECM) 40, which may be mounted under seat pan 18, for example. In the illustrated embodiment, the connector stub 30d passes between the foam bottom and back cushions 14, 16 to join ECM 40, but other configurations are also possible. For example, the connector stub 30d may depend from the front edge of upper or lower major surfaces 30a, 30b of flexible printed circuit 30, and pass through the seat pan 18 to join ECM 40. Also, the flexible printed circuit 30 may be folded around the front or sides of the dielectric mat 28, if desired.

When the flexible printed circuit 30 is folded around the dielectric mat 28, the conductor strips 34 and 36 are physically separated by the dielectric mat 28 but periodically overlap in the vertical direction (i.e., in a direction perpendicular to the dielectric mat 28) throughout the seating surface 14a of foam bottom cushion 14 due to their orthogonal (i.e., mutually perpendicular) orientation. In the illustrated embodiment with four conductor strips 34 on the upper major surface 30a and four conductor strips on the lower major surface 30b, there are sixteen individual regions of overlap between the two sets of conductor strips. Of course, the number and size of the conductor strips on the upper and/or lower major surfaces 30a, 30b may be configured differently than shown to increase or decrease the number of overlap regions. In any event, each overlap region defines a capacitive load cell, with the overlapping portions of the conductor strips 34 and 36 acting as the capacitor plates and the intervening dielectric mat 28 acting as the capacitive dielectric. Each such capacitive load cell has a quiescent or "empty seat" capacitance based on the plate area, the dielectric constant of the mat 28 and the effective distance between the overlapping conductor strips 34, 36. When occupant weight is applied to the seat 10, the dielectric mat 28 variably deforms, changing the effective distance between the overlapping portions of conductor strips 34, 36. This changes the capacitances of the various capacitive load cells defined by the overlapping conductor regions, and the control module 40 measures the capacitance values to determine the applied occupant weight and its distribution over the seating area 14a.

As indicated above, any given capacitive load cell of the sensor assembly 26 is defined by the dielectric mat 28 and overlapping portions of one conductor strip 34 and one conductor strip 36. Conversely, any given pair of upper and lower conductor strips 34, 36 corresponds to a single capacitive load cell. Accordingly, measuring the capacitance of a given load cell involves connecting a measurement circuit to the pair of conductor strips 34, 36 corresponding to that load cell. Each of the remaining conductor strips 34, 36 are temporarily tied to a fixed reference potential (virtual ground potential, for example) so that the measured capacitance corresponds solely to the given load cell. The capacitance of the various load cells are sequentially determined to detect both the applied occupant seat weight and its distribution. In general, the cumulative change in capacitance of the load cells reflects the total seated weight, and the individual capacitance changes provide a profile of the occupant weight distribution across the seating area 14a.

Figure 4:
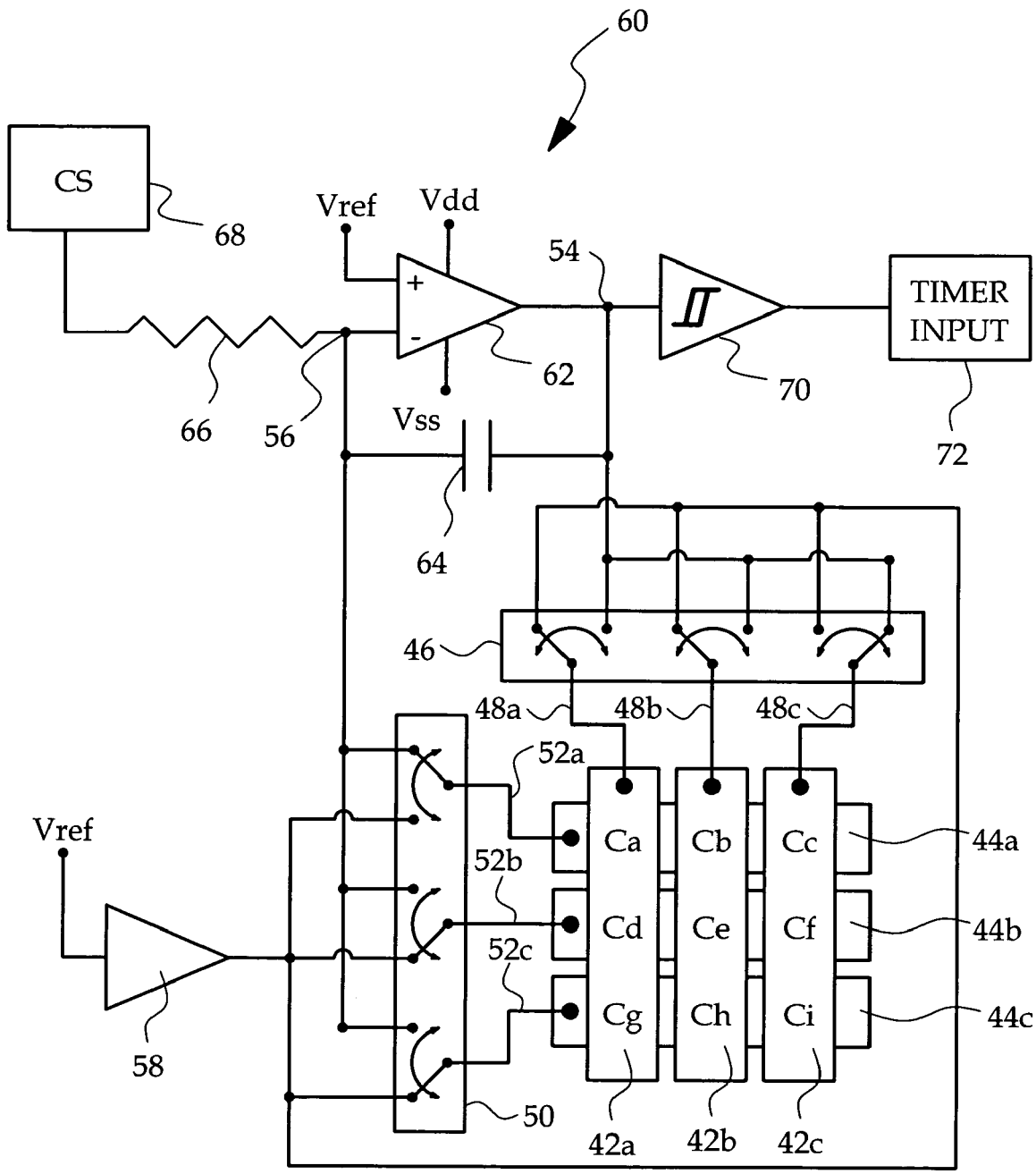
FIG. 4 is a diagram of a capacitance measurement circuit for the capacitive sensing apparatus of FIGS. 1–2.

FIG. 4 illustrates a capacitance measurement technique as applied to a capacitive sensor assembly in which the upper and lower major surfaces 30a, 30b of flexible circuit 30 each support a set of three conductor strips 42a, 42b, 42c and 44a, 44b, 44c. The nine capacitive load cells defined by the overlapping regions of conductor strips 42a, 42b, 42c and 44a, 44b, 44c are designated as Ca, Cb, Cc, Cd, Ce, Cf, Cg, Ch and Ci. A first multiplexer 46 is coupled to the upper conductor strips 42a, 42b, 42c via lines 48a, 48b, 48c; and a second multiplexer 50 is coupled to the lower conductor strips 44a, 44b, 44c via lines 52a, 52b, 52c. As indicated, each multiplexer 46, 50 couples a selected one of its conductor strips to a respective capacitance measurement node 54, 56 and the remaining conductor strips to a reference voltage $V_{REF}$ via amplifier 58. In the illustration of FIG. 4, the upper multiplexer 46 has selected the conductor strip 42c and the lower multiplexer 50 has selected conductor strip 44a, thereby coupling the capacitive load cell Cc across the measurement nodes 54, 56. A microprocessor or state machine (not shown) coordinates the operation of multiplexers 46 and 50 to select any given capacitive load cell to the measurement nodes 54, 56.

The capacitance of a selected capacitive load cell is determined by a measurement circuit 60 within ECM 40 including an operational amplifier 62 referenced to a DC supply voltage Vdd (5 VDC, for example) and the circuit ground Vss. The measurement node 54 is coupled to the amplifier's output, and the measurement node 56 is coupled to the amplifier's negative input. A bias capacitor 64 provides AC coupling between the measurement nodes 54, 56, and the positive input of amplifier 62 is connected to the reference voltage $V_{REF}$ (2.5 VDC, for example). Resistor 66 couples the measurement node 56 to a bi-directional current supply (CS) 68 that alternately sources and sinks a constant charging current $I_{CS}$. The operational amplifier 62 characteristically attempts to maintain the voltage at its negative input equal to the reference voltage $V_{REF}$ by varying its output voltage at measurement node 54. As a result, voltage at measurement node 54 decreases in magnitude at a linear ramp rate proportional to both $I_{CS}$ and the load cell capacitance C when the current supply is sourcing current, and increases in magnitude at the same linear ramp rate when the current supply is sinking current. The ramp rate (and hence the load cell capacitance) is determined by using a timer 72 to measure the time for the voltage at measurement node 54 to increase or decrease by a reference amount defined by a window comparator 70. Since the change in voltage at measurement node 54 is the same whether increasing or decreasing, the measured time can be used to accurately and directly represent the load cell capacitance C.

In summary, the sensing apparatus of the present invention provides improved sensing resolution and reduced susceptibility to measurement errors with a low-cost capacitive sensor assembly. While the sensing apparatus has been described in reference to the illustrated embodiment, it should be understood that various modifications in addition to those mentioned above will occur to persons skilled in the art. For example, the assembly 26 may be located above or inside the seat foam. Furthermore, the upper and lower conductor strips 34, 36 do not have to be orthogonal, and can vary in width or extent to suit a particular application. Also, it is possible to select more than one capacitive load cell at a time for capacitance measurement, particularly in areas of the seating surface where lower measurement resolution is sufficient. Accordingly, it is intended that the invention not be limited to the disclosed embodiment, but that it have the full scope permitted by the language of the following claims.

The invention claimed is:

1. Capacitive apparatus for sensing occupant weight applied to a seating surface of a seat, comprising:
   a deflectable dielectric mat disposed between said seating surface and a frame of said seat;
   an elongate flexible circuit folded around said dielectric mat and supporting first and second sets of conductor strips in proximity to upper and lower surfaces of said dielectric mat, respectively, where said first and second sets of conductor strips periodically overlap in a direction perpendicular to the upper and lower surfaces of said dielectric mat to define a distributed array of capacitive load cells responsive to occupant weight applied to said seating surface; and
   capacitance measurement circuitry coupled to said conductor strips for measuring a capacitance of a selected capacitive load cell by coupling a measurement circuit to a pair of conductor strips that define the selected capacitive load cell.

2. The apparatus of claim 1, where the capacitance measurement circuitry applies a reference potential to conductor strips that do not define the selected capacitive load cell.

3. The apparatus of claim 1, where said flexible circuit includes a depending connector stub for coupling said capacitance measurement circuitry to said conductor strips.

4. The apparatus of claim 1, where said capacitance measurement circuitry sequentially measures a capacitance of each capacitive load cell.

5. The apparatus of claim 4, where said capacitance measurement circuitry detects a cumulative change in capacitance of the capacitive load cells as a measure of deformation of said dielectric mat due to occupant weight.

6. The apparatus of claim 4, where said capacitance measurement circuitry detects capacitance changes of said capacitive load cells to determine a distribution of the occupant weight across said seating area.

* * * * *